(12) United States Patent
Sato et al.

(10) Patent No.: US 7,875,839 B2
(45) Date of Patent: Jan. 25, 2011

(54) SOLID STATE IMAGING DEVICE THAT GENERATES COLOR PIXEL SIGNALS CORRESPONDING TO A COLOR FILTER

(75) Inventors: Koichi Sato, Saitama (JP); Yusuke Nonaka, Tokyo (JP)

(73) Assignee: Hoya Corporation, Tokyo (JP)

( * ) Notice: Subject to any disclaimer, the term of this patent is extended or adjusted under 35 U.S.C. 154(b) by 1288 days.

(21) Appl. No.: 11/401,219

(22) Filed: Apr. 11, 2006

(65) Prior Publication Data
US 2006/0226342 A1 Oct. 12, 2006

(30) Foreign Application Priority Data
Apr. 12, 2005 (JP) .......................... P2005-114713

(51) Int. Cl.
*H01L 27/00* (2006.01)
(52) U.S. Cl. ............. 250/208.1; 250/214.1; 250/214 R; 348/277; 348/278; 348/280; 348/281
(58) Field of Classification Search ............... 250/214.1, 250/214 R, 226, 208.1; 348/272, 277, 278, 348/280, 281, 294, 302
See application file for complete search history.

(56) References Cited

U.S. PATENT DOCUMENTS

| 5,418,564 A | 5/1995 | Aoki et al. |
| 5,786,588 A | 7/1998 | Takahashi |
| 6,337,713 B1 | 1/2002 | Sato |
| 2002/0012054 A1 * | 1/2002 | Osamato ................... 348/273 |
| 2003/0193585 A1 | 10/2003 | Ogura et al. |
| 2005/0068434 A1 * | 3/2005 | Hatano ..................... 348/272 |
| 2005/0206763 A1 * | 9/2005 | Kochi et al. ................. 348/302 |
| 2005/0280727 A1 | 12/2005 | Sato et al. |

FOREIGN PATENT DOCUMENTS

| JP | 8-182005 | 7/1996 |
| JP | 2000-341699 | 12/2000 |
| JP | 3277555 | 2/2002 |
| JP | 3432051 | 5/2003 |
| JP | 2003-259227 | 9/2003 |
| JP | 2003-284086 | 10/2003 |
| JP | 2004-120797 | 4/2004 |

* cited by examiner

*Primary Examiner*—Georgi Y Epps
*Assistant Examiner*—Francis M Legasse, Jr.
(74) *Attorney, Agent, or Firm*—Greenblum & Bernstein P.L.C.

(57) ABSTRACT

A solid state imaging device comprises a color filter, a pixel, and first and a second output lines. The color filter has color filter components of a first and second color. Each pixel is covered by the color filter component and has a photoelectric conversion element. The photoelectric conversion element generates color pixel signals according to amount of light received by the photoelectric conversion element. A first pixel is covered by the first color filter component. A first color pixel signal is generated by the first pixel. The first output line outputs only the first color pixel signal. A second pixel is covered by the second filter component. A second color pixel signal is generated by the second pixel. The second output line outputs only the second color pixel signal. The first and second pixels are arranged in two dimensions.

6 Claims, 14 Drawing Sheets

FIG. 11

| Ye | G | Ye | Mg |
|----|----|----|----|
| Cy | Mg | Cy | G | ns
SOLID STATE IMAGING DEVICE THAT GENERATES COLOR PIXEL SIGNALS CORRESPONDING TO A COLOR FILTER

BACKGROUND OF THE INVENTION

1. Field of the Invention

The present invention relates to a solid state imaging device, which generates color pixel signals corresponding to a color filter covering the imaging device.

2. Description of the Related Art

A CMOS solid state imaging device, manufactured by using a CMOS LSI manufacturing process is known as a prior art imaging device having an XY address system.

An imaging device 10' comprises pixels 21', an output line 14', vertical transmission lines 15', and so on, as shown in FIG. 14. The vertical transmission lines 15' pass vertically through a receiving surface of the imaging device 10'. And each vertical transmission line 15' is connected to pixels 21' which are vertically arranged along the vertical transmission lines 15'. The vertical transmission lines 15' are connected to the output line 14'. Each pixel 21' generates a pixel signal in accordance with a received light amount. The pixel signals are transferred to the output terminal of the imaging device 10' via the vertical transmission lines 15' and the horizontal output line 14' in order. Finally, the pixel signals are output to an image signal processor.

Each pixel 21' is covered by a color filter (not depicted) in order to capture a color image. A red-pixel, covered by a red color filter, generates a red pixel signal in accordance with a red component of the received light amount. A green-pixel, covered by a green color filter, generates a green pixel signal in accordance with a green component of the received light amount. A blue-pixel, covered by a blue color filter, generates a blue pixel signal in accordance with a blue component of the received light amount. A white balance process is carried out on the pixel signals in order to display an accurate color image. In the white balance process, each pixel signal is amplified by an adequate gain. The adequate gains for the red, green and blue pixel signals are different from each other.

Prior art imaging devices output red, green, and blue pixel signals through a single output terminal. So, a pixel-gain-amplifier, that can quickly change a gain in accordance with the color of the pixel signal to be amplified, is required.

SUMMARY OF THE INVENTION

Therefore, an object of the present invention is to amplify the red, green, and blue pixel signal respectively with adequate gains, without using a pixel-gain-amplifier.

According to the present invention, a solid state imaging device comprises a color filter, a pixel, and first and a second output lines. The color filter has color filter components of a first and second color. Each pixel is covered by the color filter component and has a photoelectric conversion element. The photoelectric conversion element generates color pixel signals according to amount of light received by the photoelectric conversion element. A first pixel is covered by the first color filter component. A first color pixel signal is generated by the first pixel. The first output line outputs only the first color pixel signal. A second pixel is covered by the second filter component. A second color pixel signal is generated by the second pixel. The second output line outputs only the second color pixel signal. The first and second pixels are arranged in two dimensions.

Further preferably, a solid state imaging device should comprise first and second transmission lines. The first transmission line is connected only to the first pixel and first output line. The first transmission line transmits the first color pixel signal output from the first pixel to the first output line. The second transmission line is connected only to the second pixel and the second output line. The second transmission line transmits a second color pixel signal output from the second pixel, to the second output line.

Further, preferably, a solid state imaging device should comprise a common transmission line and a controller. The common transmission line is connected to the first pixel, the second pixel, the first output line, and the second output line. The common transmission line transmits the color pixel signal output from the first and the second pixels. The controller controls transmission of the color pixel signals to the first output line when a color pixel signal output to the common transmission line is the first color pixel signal. The controller controls transmission of the color pixel signals to the second output line when a color pixel signal output to the common transmission line is the second color pixel signal.

Further, preferably, the common transmission line is connected to first and second current sources. The first and second current sources are turned on and off by said controller. The color pixel signal is transmitted to the first output line when the first current source is turned on. The color pixel signal is transmitted to the second output line when the second current source is turned on.

Further, preferably, a solid state imaging device should have a switch. The switch has an input terminal and first and second output terminals. The input terminal is connected to the common transmission line. The first and second output terminals are respectively connected to the first and second output lines. The pixel signal can be transmitted from the input terminal to the first output terminal when the controller inputs a first switching signal to the switch. The pixel signal can be transmitted from the input terminal to the second output terminal when the controller inputs a second switching signal to the switch.

BRIEF DESCRIPTION OF THE DRAWINGS

The objects and advantages of the present invention will be better understood from the following description, with reference to the accompanying drawings in which:

FIG. 11 illustrates a color filter arrangement according to the complementary-color-difference line-sequential type;

DESCRIPTION OF THE PREFERRED EMBODIMENTS

Figure 1:
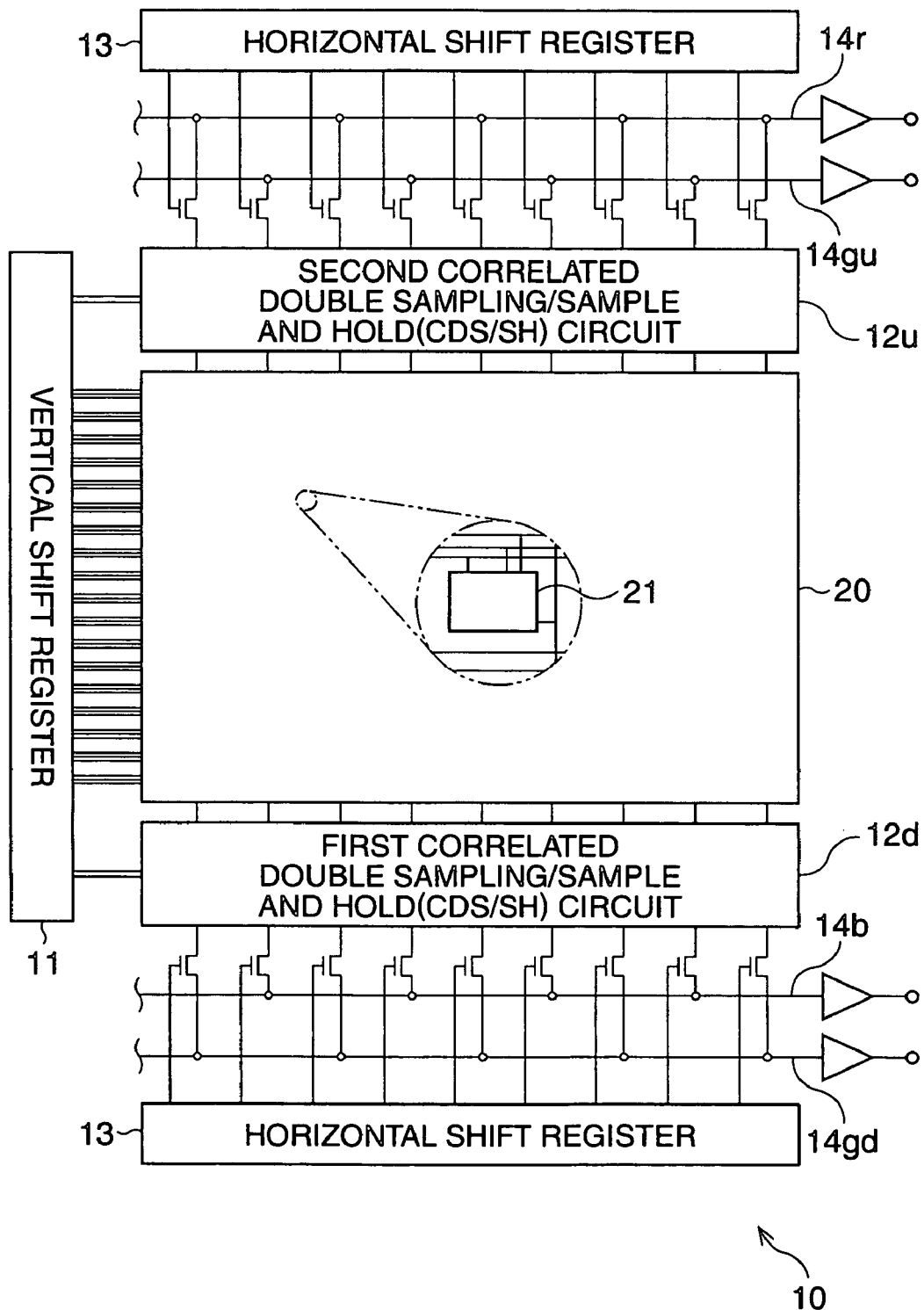
FIG. 1 schematically illustrates a structure of a first embodiment.

The present invention is described below with reference to the embodiments shown in the drawings.

FIG. 1 schematically illustrates a structure of a first embodiment.

The CMOS solid state imaging device 10 comprises an imaging block 20, a vertical shift register 11, a first correlated double sampling/sample and hold (CDS/SH) circuit 12d, a second CDS/SH circuit 12u, a horizontal shift register 13, output lines for green pixel signals (hereinafter referred to as G output lines) 14gd, 14gu, and output lines for red pixel signals (hereinafter referred to as R output lines) 14r, and output lines for blue pixel signals (hereinafter referred to as B output lines) 14b. A vertical shift register 11 is directly connected to an imaging block 20. The green and blue output lines 14gd, 14b are connected to an imaging block 20 through the first CDS/SH circuit 12d. The green and red output lines 14gu, 14r are connected to an imaging block 20 through the second CDS/SH circuit 12u.

Plural pixels 21 are arranged at a light receiving surface of the imaging block 20 in a matrix. A signal charge is generated in each pixel 21. The set of pixel signals that is generated in all the pixels 21 on the light receiving surface, comprises image signals corresponding to the image of the photographed object. A pixel signal is output from each pixel 21 one by one. The vertical and horizontal shift registers 11, 13 are used to select the pixel 21 that outputs a pixel signal.

The vertical shift register 11 selects a horizontal line, that is the row of the pixel 21 that will output a signal. The first and second CDS/SH circuits 12d, 12u perform a correlated double sampling of a pixel signal from the pixels 21 in the row selected by the vertical shift register 11. The horizontal shift registers 13 selects the pixel signal sampled and held by the first and second CDS/SH circuit 12, and then the pixel signal is transferred to the G, R, B output lines 14gu, 14gd, 14r, 14b. Then the pixel signal is output to the computer (not depicted) for signal processing through the G, R, and B output lines 14gu, 14gd, 14r, 14b. The computer carries out some image processes on the pixel signal, and the pixel signal is transformed to the image signal.

Figure 2:
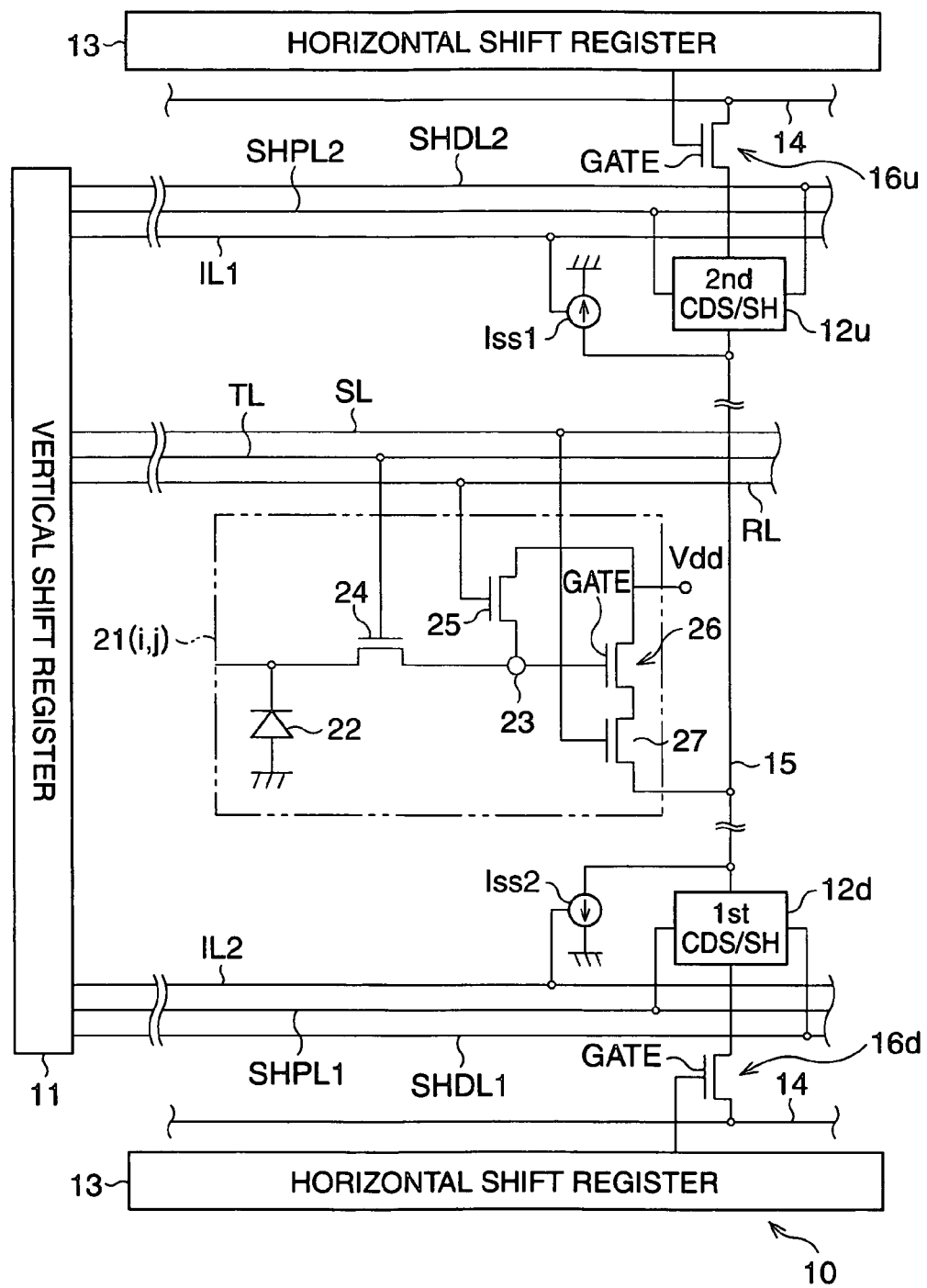
FIG. 2 illustrates a circuit structure of the imaging device, focusing on a circuit structure of one pixel of a first embodiment.

FIG. 2 illustrates a circuit structure of the imaging device, focusing on a circuit structure of one pixel 21 of the first embodiment. The structure of a pixel which is arranged in row i and column j, is referred to as pixel 21(i,j). In FIG. 2, the pixel 21(i,j) is explained in the following description. The structure of the other pixels is the same as that of the pixel 21(i,j).

The pixel 21(i,j) comprises a photodiode (PD) 22, a floating diffusion (FD) 23, a transfer transistor 24, a reset transistor 25, an amplifier transistor 26, and a row select transistor 27.

An electrical charge is generated at the PD 22 according to an amount of light received by the pixel 21(i,j). The PD 22 stores the generated electric charge.

A source and a drain of the transfer transistor 24 are respectively connected to the PD 22 and the FD 23. A gate of the transfer transistor 24 of the pixel 21(i,j) is connected to a transfer-signal-line, hereinafter referred to as TL, in this example.

The TL runs horizontally between the successive, vertically arranged pixels. Signals having ON and OFF pulse patterns flow alternately through the TL. When the ON signal flows through the TL, the transfer transistor 24 of the pixel 21(i,j) transfers electrical charge from the PD 22 to the FD 23. The FD 23 receives the electrical charge and generates a voltage in accordance with the received electrical charge.

A source and a drain of the reset transistor 25 of the pixel 21(i,j) are respectively connected to the FD 23 and a power source, hereinafter referred to as Vdd. An electrical potential is kept at a predetermined level at the Vdd. A gate of the reset transistor 25 of the pixel 21(i,j) is connected to a reset-signal-line, hereinafter referred to as RL.

The RL runs horizontally between successive pixels, arranged vertically. Signals having ON and OFF pulse patterns flow alternately through the RL. When the ON signal flows through the RL, the electrical charge received by the FD 23 is reset by sweeping out the electrical charge to the Vdd through the reset transistor 25. Then the electrical potential of the FD 23 is reset to the electrical potential of the Vdd.

A gate and a source of the amplifier transistor 26 of the pixel 21(i,j) are respectively connected to the FD 23 and a drain of the row select transistor 27. A drain of the amplifier transistor 26 of the pixel 21(i,j) is connected to the Vdd. A voltage signal, in accordance with the electrical potential of the FD 23, is output as a pixel signal from the amplifier transistor 26 to the row select transistor 27.

A source and a gate of the row select transistor 27 are respectively connected to a vertical transmission line 15 and the select-signal-line, hereinafter referred to as SL.

The SL runs horizontally between the successive, vertically arranged pixels. Signals having ON and OFF pulse patterns, flow alternately through the SL. When the ON signal flows through the SL, the drain and the source of the row select transistor 27 become conductive. Then the pixel signal is output from the row select transistor 27 to the vertical transmission line 15.

The TL, RL, and SL are connected to the vertical shift register 11. The vertical shift register 11 controls the timing and the output of the ON and OFF signals respectively to the TL, RL, and SL.

The lower end of the vertical transmission line 15 is connected to the first CDS/SH circuit 12d and the second current source, hereinafter referred to as Iss2, in parallel. The upper end of the vertical transmission line 15 is connected to the second CDS/SH circuit 12u and the first current source, hereinafter referred to as Iss1, in parallel.

The Iss1 and Iss2 can be turned on and off. When the Iss1 is turned on, the pixel signal is transmitted to the first CDS/SH circuit 12d. When the Iss2 is turned on, the pixel signal is transmitted to the second CDS/SH circuit 12u.

The Iss1 and Iss2 are respectively connected to a first and second current-source-signal-line, hereinafter referred to as IL1 and IL2. Signals having ON and OFF pulse patterns alternately flow through the IL1 and IL2. When the ON signal flows through the IL1 and IL2, the Iss1 and Iss2 respectively turn on. When the OFF signal flows through the IL1 and IL2, the Iss1 and Iss2 respectively turn off.

The IL1 and IL2 are connected to the vertical shift register 11. The vertical shift register 11 controls the timing of the output of the ON and OFF signals to the IL1 and IL2, respectively.

A first pre-sample-hold-signal-line, hereinafter referred to as SHPL1, and a first data-sample-hold-signal-line, hereinafter referred to as SHDL1, are connected to the first CDS/SH circuit 12d. A second SHPL2 and a second SHDL2 are connected to the second CDS/SH circuit 12u. Signals having ON and OFF pulse patterns flow alternately through the SHPL1, SHPL2, SHDL1 and SHDL2. The SHPL1, SHPL2, SHDL1 and SHDL2 are connected to the vertical shift register 11. The vertical shift register 11 controls the timing of the output of the ON and OFF signals to the SHPL1, SHPL2, SHDL1 and SHDL2.

When the ON signal flows through the SHPL1 and SHPL2, a reset pixel signal, that is generated by the pixel 21 in accordance with the electrical potential of the reset FD 23, is sampled and held by the first and second CDS/SH circuits 12d, 12u. When the ON signal flows through the SHDL1 and SHDL2, a raw pixel signal data, that is generated by the pixel 21 in accordance with the electrical potential of the FD 23 receiving the signal charge, is sampled and held respectively by the first and second CDS/SH circuits 12d, 12u. The first and second CDS/SH circuits 12d, 12u generate pixel signal data by subtracting the reset pixel signal from the raw pixel signal data. The pixel signal data can be output from output terminals of the first and second CDS/SH circuits 12d, 12u.

The output terminal of the first CDS/SH circuit 12d is connected to a source of a column select transistor 16d of a lower side. The output terminal of the second CDS/SH circuit 12u is connected to a source of a column select transistor 16u of an upper side. Drains of column select transistors 16d, 16u of the lower and upper sides are connected respectively to different output lines 14. The output lines 14, described here and shown in FIG. 2, are some of the R, G, and B output lines 14r, 14gu, 14gd, 14b shown in FIG. 1. Gates of column select transistors 16d, 16u of the lower and upper sides are connected to the horizontal shift register 13.

Signals having ON and OFF pulse patterns are input to the gates of column select transistor 16d, 16u of the lower and upper sides from the horizontal shift register 13. When the ON signal is input to the gates of column select transistor 16d, 16u of the lower and upper sides, the pixel signal data is output to the output line 14 from the first and second CDS/SH circuits 12d, 12u.

Figure 3:
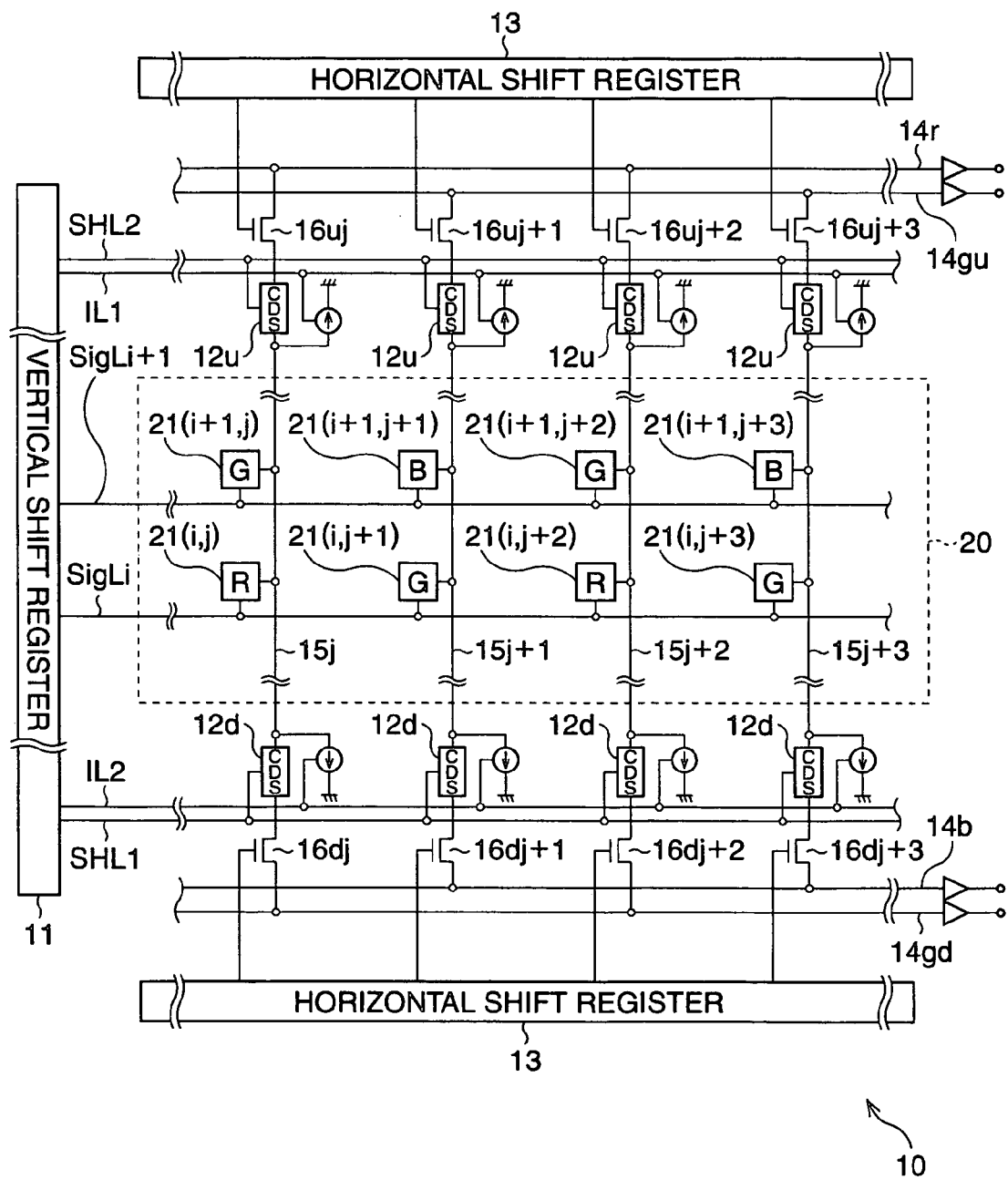
FIG. 3 illustrates a structure of the imaging device, focusing on an arrangement of the pixels and connections between each pixel and the R, G, and B output lines.

FIG. 3 illustrates a structure of the imaging device, focusing on an arrangement of the pixels and connections between each pixel, and the R, G, and B output lines 14r, 14gu, 14gd, 14b. For ease of understanding, the TL, RL, and SL of row i from the lower end of the imaging block 20, are represented by a signal-line of row i, hereinafter referred to as SigLi in FIG. 3. Similarly, the TL, RL, and SL of row i+1 are represented by a signal-line of row i+1, referred to as SigLi+1 in FIG. 3. For ease of understanding, the SHPL1 and SHDL1 are represented by a first sample-hold-signal-line, hereinafter referred to as SHL1, in FIG. 3. Similarly, the SHPL2 and SHDL2 are represented by a second sample-hold-signal-line, hereinafter referred to as SHL2, in FIG. 3.

R pixels are covered with a red color filter component (not depicted), and are pixels 21(i,j), 21(i,j+2) in FIG. 3. G pixels are covered with a green color filter component (not depicted), and are pixels 21(i+1,j), 21(i,j+1), 21(i+1,j+2), 21(i,j+3) in FIG. 3. B pixels are covered with a blue color filter component (not depicted), and are pixels 21(i+1,j+1), 21(i+1,j+3) in FIG. 3. R, G, and B pixels are arranged according to the Bayer color array. Consequently, there are GR columns, that comprise G pixels and R pixels arranged vertically and alternately, on the imaging block 20. And there are GB columns, that comprise G pixels and B pixels arranged vertically and alternately. And the GR columns and GB columns are arranged horizontally and alternately.

The G pixel 21(i+1,j) and R pixel 21(i,j) arranged in the GR column j on a left side of the imaging block 20, are connected to a vertical transmission line 15j of column j. An upper end of the vertical transmission line 15j of column j is connected to the R output line 14r via the second CDS/SH circuit 12u and the column select transistor 16uj of the upper side of column j. A lower end of the vertical transmission line 15j of column j is connected to the G output line 14gd via the first CDS/SH circuit 12d and the column select transistor 16dj of the lower side of column j.

The G pixel 21(i,j+1) and B pixel 21(i+1,j+1), arranged in the GB column j+1 on a left side of the imaging block 20, are connected to a vertical transmission line 15j+1 of column j+1. An upper end of the vertical transmission line 15j+1 of column j+1 is connected to the G output line 14gu via the second CDS/SH circuit 12u and the column select transistor 16uj+1 of the upper side of column j+1. A lower end of the vertical transmission line 15j+1 of column j+1 is connected to the B output line 14b via the first CDS/SH circuit 12d and the column select transistor 16dj+1 of the lower side of column j+1.

Figure 4:
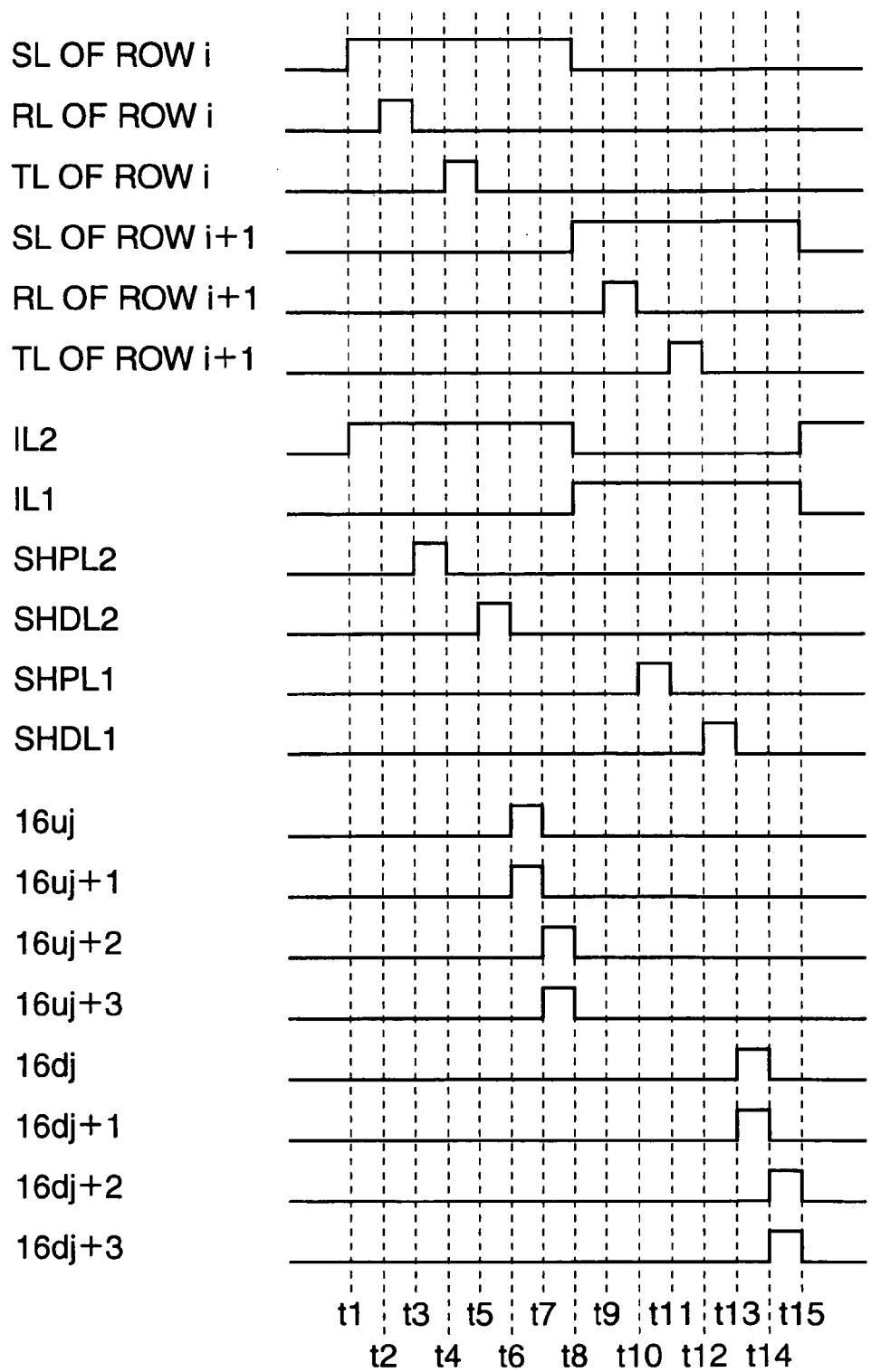
FIG. 4 is a timing-chart of the data output process of the imaging device.

The operation of the imaging device 10 in the first embodiment is described below with reference to FIG. 4, which is a timing-chart of the data output process of the imaging device 10. The operation of eight pixels in rows i/i+1 and columns j~j+3 is described here. However, the operations of other pixels are the same as these pixels.

At the time t1, the vertical shift register 11 outputs an ON signal to the SL of row i, and then the pixels of row i are selected to output pixel signal. At the same time, the vertical shift register 11 outputs an ON signal to the IL2, and then a pixel signal can be output from each pixel in row i to the second CDS/SH circuit 12u.

At the time t2, the vertical shift register 11 outputs an ON signal to the RL of row i, and then the FDs 23 of the pixels in row i are reset.

At the time t3, the vertical shift register 11 outputs an OFF signal to the RL of row i. At the same time, the vertical shift register 11 outputs an ON signal to the SHPL2, and then the reset pixel signal from pixels in row i is sampled and held by the second CDS/SH circuit 12u.

At the time t4, the vertical shift register 11 outputs an OFF signal to the SHPL2. At the same time, the vertical shift register 11 outputs an ON signal to the TL of row i, and then signal charges stored by the PDs 22 of the pixels in row i are transmitted to the FDs 23.

At the time t5, the vertical shift register 11 outputs the OFF signal to the TL of row i. At the same time, the vertical shift register outputs an ON signal to the SHDL2, and then the raw pixel signal data from pixels in row i is sampled and held by the second CDS/SH circuit 12u.

At the time t6, the vertical shift register 11 outputs an OFF signal to the SHDL2. At the same time, the horizontal shift register 13 outputs an ON signal to the gate of column select transistors 16uj, 16uj+1 of the upper side of columns j and j+1. And then pixel signal data of the R pixels 21(i,j) and the G pixels 21(i,j+1) are transmitted to the respective R and G output lines 14r, 14gu.

At the time t7, the horizontal shift register 13 outputs an OFF signal to the gate of column select transistors 16uj, 16uj+1 of the upper side of columns j and j+1. At the same time, the horizontal shift register 13 outputs an ON signal to the gate of column select transistors 16uj+2, 16uj+3 of the upper side of columns j+2 and j+3, and then pixel signal data of the R pixel 21(i,j+2) and the G pixel 21(i,j+3) are transmitted to the respective R and G output lines 14r, 14gu.

Other pixel signal data for pixels in row i are transmitted to the R and G output lines 14r, 14gu as the same times t6 and t7.

At the time t8, the vertical shift register 11 outputs an OFF signal to the SL of row i and IL2. At the same time, the vertical shift register 11 outputs an ON signal to the SL of row i+1, and then the pixels of row i+1 are selected to output pixel signals. Further, at the same time, the vertical shift register 11 outputs an ON signal to the IL1, and then a pixel signal can be output from each pixel in row i+1 to the first CDS/SH circuit 12d.

At the time t9, the vertical shift register 11 outputs an ON signal to the RL of row i+1, and then the FDs 23 of the pixels in row i+1 are reset.

At the time t10, the vertical shift register 11 outputs an OFF signal to the RL of row i+1. At the same time, the vertical shift register 11 outputs an ON signal to the SHPL1, and then a reset pixel signal, from pixels in row i+1, is sampled and held by the first CDS/SH circuit 12d.

At the time t11, the vertical shift register 11 outputs an OFF signal to the SHPL1. At the same time, the vertical shift register 11 outputs an ON signal to the TL of row i+1, and then signal charges stored by the PDs 22 of the pixels in row i+1 are transmitted to the FDs 23.

At the time t12, the vertical shift register 11 outputs an OFF signal to the TL of row i+1. At the same time, the vertical shift register 11 outputs an ON signal to the SHDL1, and then the raw pixel signal data from the pixels in row i+1 is sampled and held by the first CDS/SH circuit 12d.

At the time t13, the vertical shift register 11 outputs an OFF signal to the SHDL1. At the same time, the horizontal shift register 13 outputs an ON signal to the gates of column select transistors 16dj, 16dj+1 of the lower side of columns j and j+1, and then pixel signal data of the G pixel 21(i+1,j) and the B pixel 21(i+1,j+1) is transmitted respectively to the G and B output lines 14gd, 14b.

At the time t14, the horizontal shift register 13 outputs an OFF signal to the gates of column select transistors 16dj, 16dj+1 of the lower side of columns j and j+1. At the same time, the horizontal shift register 13 outputs an ON signal to the gates of column select transistor 16dj+2, 16dj+3 of the lower side of columns j+2 and j+3, and then pixel signal data of the G pixel 21(i+1,j+2) and the B pixel 21(i+1,j+3) is transmitted respectively to the G and B output lines 14gd, 14b.

Other pixel signal data of pixels in row i+1 are transmitted to the G and B output lines 14gd, 14b as the same times t13 and t14.

At the time t15, the vertical shift register 11 outputs an OFF signal to the SL of row i+1 and IL1.

After the time t15, other pixel signal data of pixels in other rows are transmitted to the R, G, and B output lines 14r, 14gd, 14gu, and 14b by carrying out the same control as that the above Only the pixel signal data corresponding to red, can be output from the R output line 14r, only the pixel signal data corresponding to green, can be output from the G output lines 14gd, 14gu, and only the pixel signal data corresponding to blue, can be output from the B output line 14b in the first embodiment. Accordingly, the pixel-gain-amplifier, that is required for the prior art imaging devices, is unnecessary when connecting each output line 14r, 14gd, 14gu, and 14b to an amplifier, so that the gain is set to be an adequate gain for the color. Consequently, a design of a circuit of the imaging device 10 is easy, and the manufacturing cost is lowered.

The second embodiment is explained below. The second embodiment is different from the first embodiment mainly regarding how the output lines transmit pixel signal. The second embodiment is explained mainly regarding the structures of the second embodiment that are different from those of the first embodiment. The same symbols are used for the structures that are the same as those in the first embodiment.

Figure 5:
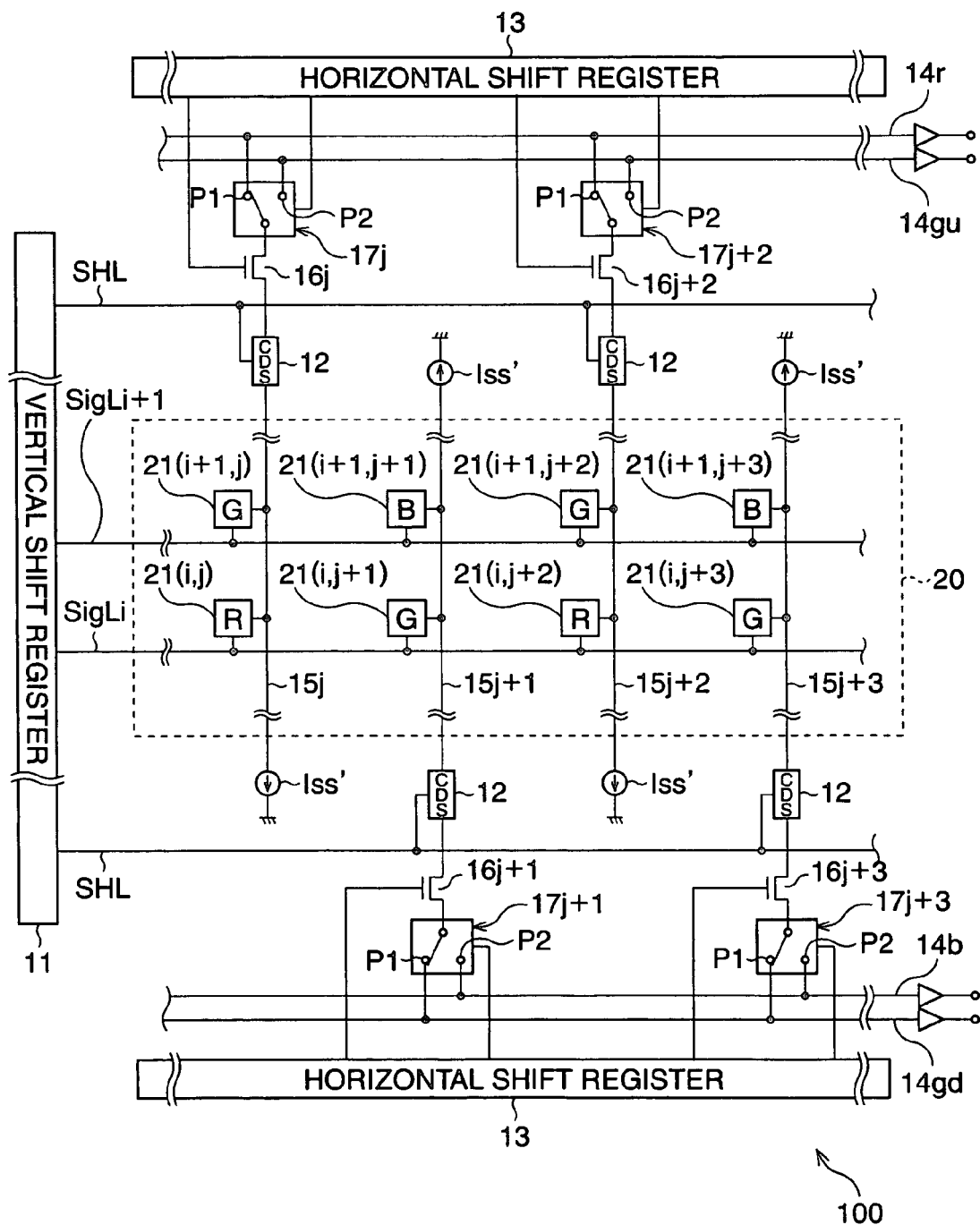
FIG. 5 illustrates a structure of the imaging device, focusing on an arrangement of the pixels and connections between each pixel and the R, G, and B output lines in the second embodiment.

FIG. 5 illustrates a structure of the imaging device, focusing on an arrangement of the pixels and connections between each pixel and the R, G, and B output lines 14r, 14gu, 14gd, 14b in the second embodiment. The circuit structure of the pixel in the second embodiment is the same as that of the first embodiment. The array of the R, G, and B pixels in the second embodiment is the same as that of the first embodiment.

The connections of vertical transmission lines 15j~15j+3 of columns j~j+3 to R, G, and B pixels 21(i,j), 21(i,j+2), 21(i+1,j), 21(i,j+1), 21(i+1,j+2), 21(i,j+3), 21(i+1,j+1), 21(i+1,j+3) in the second embodiment are same as those of the first embodiment.

An upper end of the vertical transmission line 15j of column j is connected to the R and G output lines 14r, 14gu via a CDS/SH circuit 12, a column select transistor 16j of column j, and a column switch 17j of column j. A lower end of the vertical transmission line 15j of column j is connected to a current source, hereinafter referred to as Iss'. The Iss' is always kept in the on state.

The column switch 17j of column j has first and second output terminals P1, P2. The output terminals P1, P2 are respectively connected to the R and G output lines 14r, 14gu.

A lower end of the vertical transmission line 15j+1 of column j+1 is connected to the G and B output lines 14gd, 14b via a CDS/SH circuit 12, a column select transistor 16j+1 of column j+1, and a column switch 17j+1 of column j+1. An upper end of the vertical transmission line 15j+1 of column j+1 is connected to the Iss'.

The column switch 17j+1 of column j+1 has first and second output terminals P1, P2. The output terminals P1 and P2 are respectively connected to the G and B output lines 14gd, 14b.

An upper end of the vertical transmission line 15j+2 of column j+2 is connected to the R and G output lines 14r, 14gu via a CDS/SH circuit 12, a column select transistor 16j+2 of column j+2, and a column switch 17j+2 of column j+2 in a similar way to those in the column j. A lower end of the vertical transmission line 15j+2 of column j+2 is connected to the Iss'.

The column switch 17j+2 of column j+2 has first and second output terminals P1, P2. The output terminals P1 and P2 are respectively connected to the R and G output lines 14r, 14gu.

A lower end of the vertical transmission line 15j+3 of column j+3 is connected to the G and B output lines 14gd, 14b via a CDS/SH circuit 12, a column select transistor 16j+3 of column j+3, and a column switch 17j+3 of column j+3 in a similar way to those in the column j+1. An upper end of the vertical transmission line 15j+3 of column j+3 is connected to the Iss'.

The column switch 17j+3 of column j+3 has first and second output terminals P1, P2. The output terminals P1 and P2 are respectively connected to the G and B output lines 14gd, 14b.

The column switches 17j~17j+3 of columns j~j+3 are connected to the horizontal shift register 13. The horizontal shift register 13 outputs first and second switching signals alternately to the column switches 17j~17j+3 of columns j~j+3. The pixel signal data that is input to the input terminal can be transmitted to the first output terminal P1 when the column switches 17j~17j+3 of columns j~j+3 receive the first switching signal. And, the pixel signal data that is input to the input terminal can be transmitted to the second output terminal P2 when the column switches 17j~17j+3 of columns j~j+3 receive the second switching signal.

All CDS/SH circuits 12 are connected to a pre-sample-hold-signal-line, hereinafter referred to as SHPL and a data-sample-hold-signal-line, hereinafter referred to as SHDL. The SHPL and SHDL are connected to the vertical shift register 11. The vertical shift register 11 controls the timing of the output of the ON and OFF signals to the SHPL and SHDL. For ease of understanding the SHPL and SHDL are represented by a sample-hold-signal-line, hereinafter referred to as SHL, in FIG. 5. They are in fact two lines.

This is the same as in the first embodiment where the TL, RL, and SL of row i are represented by a SigLi in FIG. 5. The functions of the CDS/SH circuit 12 and the column select transistor 16 in the second embodiment are the same as those of the first embodiment.

Figure 6:
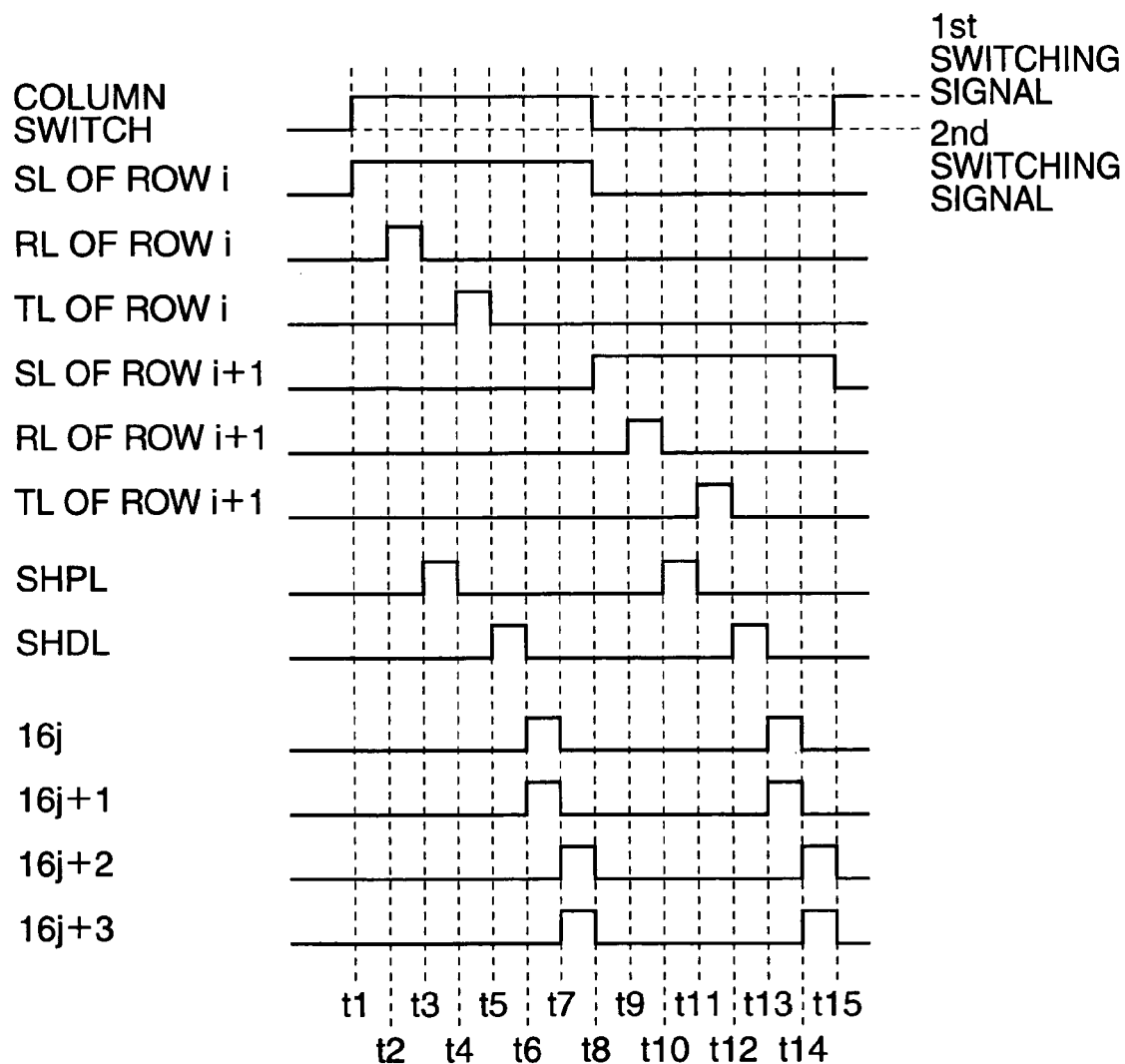
FIG. 6 is a timing-chart of the data output process of the imaging device.

The operation of the imaging device 100 in the second embodiment is described below with reference to FIG. 6, which is a timing-chart of the data output process of the imaging device 100. The operations of eight pixels in row i/i+1 and columns j~j+3 is described here.

At the time t1, the horizontal shift register 13 outputs the first switching signal all column switches 17j~17j+3 of columns j~j+3, and then the pixel signal data, input to the input terminal of all column switches 17j~17j+3 of column j~j+3, can be transmitted to the first output terminal P1. At the same time, the vertical shift register 11 outputs an ON signal to the SL of row i, and then the pixels of row i are selected to output pixel signals.

At the time t2, the vertical shift register 11 outputs an ON signal to the RL of row i, and then the FDs 23 of the pixels in row i are reset.

At the time t3, the vertical shift register 11 outputs an OFF signal to the RL of row i. At the same time, the vertical shift register 11 outputs an ON signal to the SHPL, and then reset pixel signals from pixels in row i are sampled and held by the CDS/SH circuit 12.

At the time t4, the vertical shift register 11 outputs an OFF signal to the SHPL. At the same time, the vertical shift register 11 outputs an ON signal to the TL of row i, and then signal charges stored by the PDs 22 of the pixels in row i are transmitted to the FDs 23.

At the time t5, the vertical shift register 11 outputs an OFF signal to the TL of row i. At the same time, the vertical shift register outputs an ON signal to the SHDL, and then the raw pixel signal data from pixels in row i is sampled and held by the CDS/SH circuit 12.

At the time t6, the vertical shift register 11 outputs an OFF signal to the SHDL. At the same time, the horizontal shift register 13 outputs an ON signal to the gates of column select transistors 16j, 16j+1 of columns j and j+1, and then pixel signal data of the R pixel 21(i,j) and the G pixel 21(i,j+1) is transmitted respectively to R and G output lines 14r, 14gd.

At the time t7, the horizontal shift register 13 outputs an OFF signal to the gates of column select transistors 16j, 16j+1 of columns j and j+1. At the same time, the horizontal shift register 13 outputs an ON signal to the gates of column select transistor 16j+2, 16j+3 of columns j+2 and j+3, and then pixel signal data of the R pixel 21(i,j+2) and the G pixel 21(i,j+3) is transmitted respectively to R and G output lines 14r, 14gd.

Other pixel signal data of pixels in row i is transmitted to the R and G output lines 14r, 14gd as the same times t6 and t7.

At the time t8, the horizontal shift register 13 outputs the second switching signal to all column switches 17j~j+3 of columns j~j+3, and then the pixel signal data input to the input terminal of the switches of all columns can be transmitted to the second output terminal P2. At the same time, the vertical shift register 11 outputs an OFF signal to the SL of row i. Further, at the same time, the vertical shift register 11 outputs an ON signal to the SL of row i+1, and then the pixels of row i+1 are selected to output pixel signals.

At the time t9, the vertical shift register 11 outputs an ON signal to the RL of row i+1, and then the FDs 23 of the pixels in row i+1 are reset.

At the time t10, the vertical shift register 11 outputs an OFF signal to the RL of row i+1. At the same time, the vertical shift register 11 outputs an ON signal to the SHPL, and then the reset pixel signal from pixels in row i+1 is sampled and held by the CDS/SH circuit 12.

At the time 11, the vertical shift register 11 outputs an OFF signal to the SHPL. At the same time, the vertical shift register 11 outputs an ON signal to the TL of row i+1, and then signal charges stored by the PDs 22 of the pixels in row i+1 are transmitted to the FDs 23.

At the time t12, the vertical shift register 11 outputs an OFF signal to the TL of row i+1. At the same time, the vertical shift register 11 outputs an ON signal to the SHDL, and then raw pixel signal data from pixels in row i+1 are sampled and held by the CDS/SH circuit 12d.

At the time t13, the vertical shift register 11 outputs an OFF signal to the SHDL. At the same time, the horizontal shift register 13 outputs an ON signal to the gates of column select transistors 16j, 16j+1 of columns j and j+1, and then pixel signal data of the G pixel 21(i+1,j) and the B pixel 21(i+1,j+1) are transmitted respectively to the G and B output lines 14gu, 14b.

At the time t14, the horizontal shift register 13 outputs an OFF signal to the gates of column select transistors 16j, 16j+1 of columns j and j+1. At the same time, the horizontal shift register 13 outputs an ON signal to the gates of column select transistor 16j+2, 16j+3 of columns j+2 and j+3, and then pixel signal data of the G pixel 21(i+1,j+2) and the B pixel 21(i+1,j+3) is transmitted respectively to the G and B output lines 14gu, 14b.

Other pixel signal data of pixels in row i+1 is transmitted to the G and B output lines 14gu, 14b as the same times t13 and t14.

At the time t15, the horizontal shift register 13 outputs the first switching signals all column switches 17j~17j+3 of columns j~j+3, and then the pixel signal data input to the input terminal of all column switches 17j~17j+3 of columns j~j+3 can be transmitted to the first output terminal P1. At the same time, the vertical shift register 11 outputs an OFF signal to the SL of row i+1.

After the time t15, pixel signal data of pixels in other rows is transmitted to the R, G, and B output lines 14r, 14gd, 14gu, and 14b by carrying out the same process as the above.

Only the pixel signal data corresponding to red can be output from the R output line 14r, only the pixel signal data corresponding to green can be output from the G output lines 14gd, 14gu, and only the pixel signal data corresponding to blue can be output from the B output line 14b in the second embodiment. Further, the control of the operations of the second embodiment is simpler than that of the first embodiment.

The third embodiment is explained below. The third embodiment is different from the first embodiment mainly regarding the number of horizontal transmission lines and a connection of a horizontal transmission line to a pixel. The third embodiment is explained mainly regarding the structures of the third embodiment that are different from those of the first embodiment. The same symbols are used for the structures that are the same as those in the first embodiment.

Figure 7:
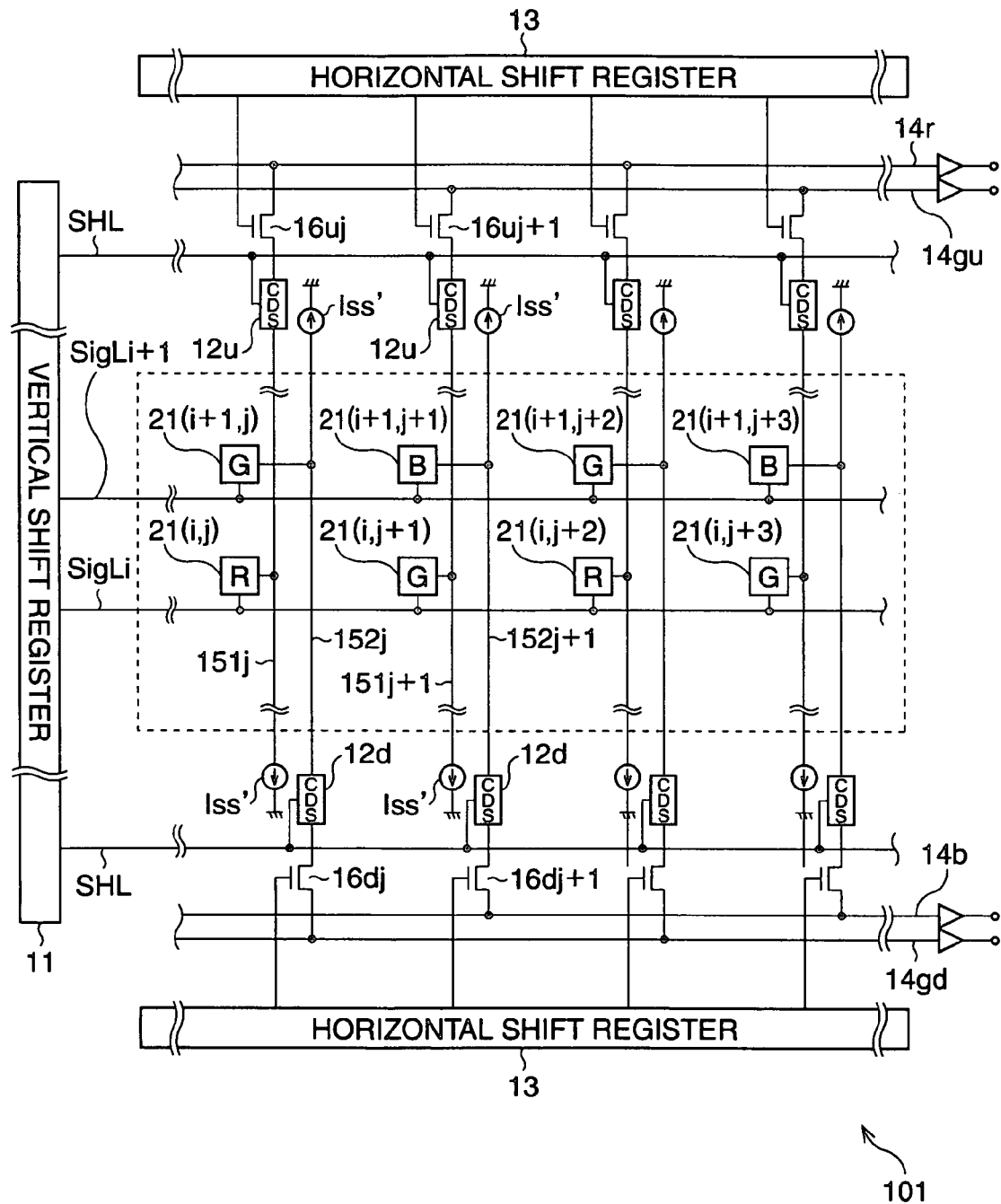
FIG. 7 illustrates a structure of the imaging device, focusing on an arrangement of the pixels and connections between each pixel and the R, G, and B output lines in the third embodiment.

FIG. 7 illustrates a structure of the imaging device, focusing on an arrangement of the pixels and connections between each pixel and the R, G, and B output lines 14r, 14gu, 14gd, and 14b in the third embodiment. The circuit structure of the pixel in the third embodiment is the same as that of the first embodiment. The array of the R, G, and B pixels in the third embodiment is the same as that of the first embodiment.

First and second vertical transmission lines 151, 152 are mounted between the GR column, in which R and G pixels are arranged, and the GB column, in which G and B pixels are arranged.

The R pixels arranged in the GR column j (reference, 21(i,j) in FIG. 7) is connected to the first vertical transmission line 151j of column j. The G pixels arranged in the GR column j (reference, 21(i,j+1) in FIG. 7) are connected to the second vertical transmission line 152j of column j.

An upper end of the first vertical transmission line 151j of column j is connected to an R output line 14r via a second CDS/SH circuit 12u and a column select transistor 16uj of the upper side of column j. A lower end of the first vertical transmission line 151j of column j is connected to an Iss'. The Iss' is always kept in the on state.

A lower end of the second vertical transmission line 152j of column j is connected to a G output line 14gd via a first CDS/SH circuit 12d and a column select transistor 16dj of the lower side of column j. An upper end of the second vertical transmission line 152j of column j is connected to the Iss'.

The G pixels arranged in the GB column j+1 (reference, 21(i,j+1) in FIG. 7) are connected to the first vertical transmission line 151j+1 of column j+1. The B pixels arranged in the GB column j+1 (reference, 21(i+1,j+1) in FIG. 7) are connected to the second vertical transmission line 152j+1 of column j+1.

An upper end of the first vertical transmission line 151j+1 of column j+1 is connected to a G output line 14gu via a second CDS/SH circuit 12u and a column select transistor 16uj+1 of the upper side of column j+1. A lower end of the first vertical transmission line 151j+1 of column j+1 is connected to an Iss'.

A lower end of the second vertical transmission line 152j+1 of column j+1 is connected to a B output line 14b via a first CDS/SH circuit 12d and a column select transistor 16dj+1 of the lower side of column j+1. An upper end of the second vertical transmission line 152j+1 of column j+1 is connected to the Iss'.

All the CDS/SH circuits 12 are connected to an SHPL and an SHDL. The SHPL and SHDL are connected to the vertical shift register 11. The vertical shift register 11 controls the timing of the output of an ON and OFF signals to the SHPL and SHDL. For ease of understanding, the SHPL and SHDL are represented by the SHL, in FIG. 7. They are in fact two lines.

In the same way as in the first embodiment that the TL, RL, and SL of row i are represented by a SigLi in FIG. 7. The functions of the first and second CDS/SH circuit 12d, 12u and the column select transistor 16d, 16u of the lower and upper side in the third embodiment are same as those of the first embodiment.

Figure 8:
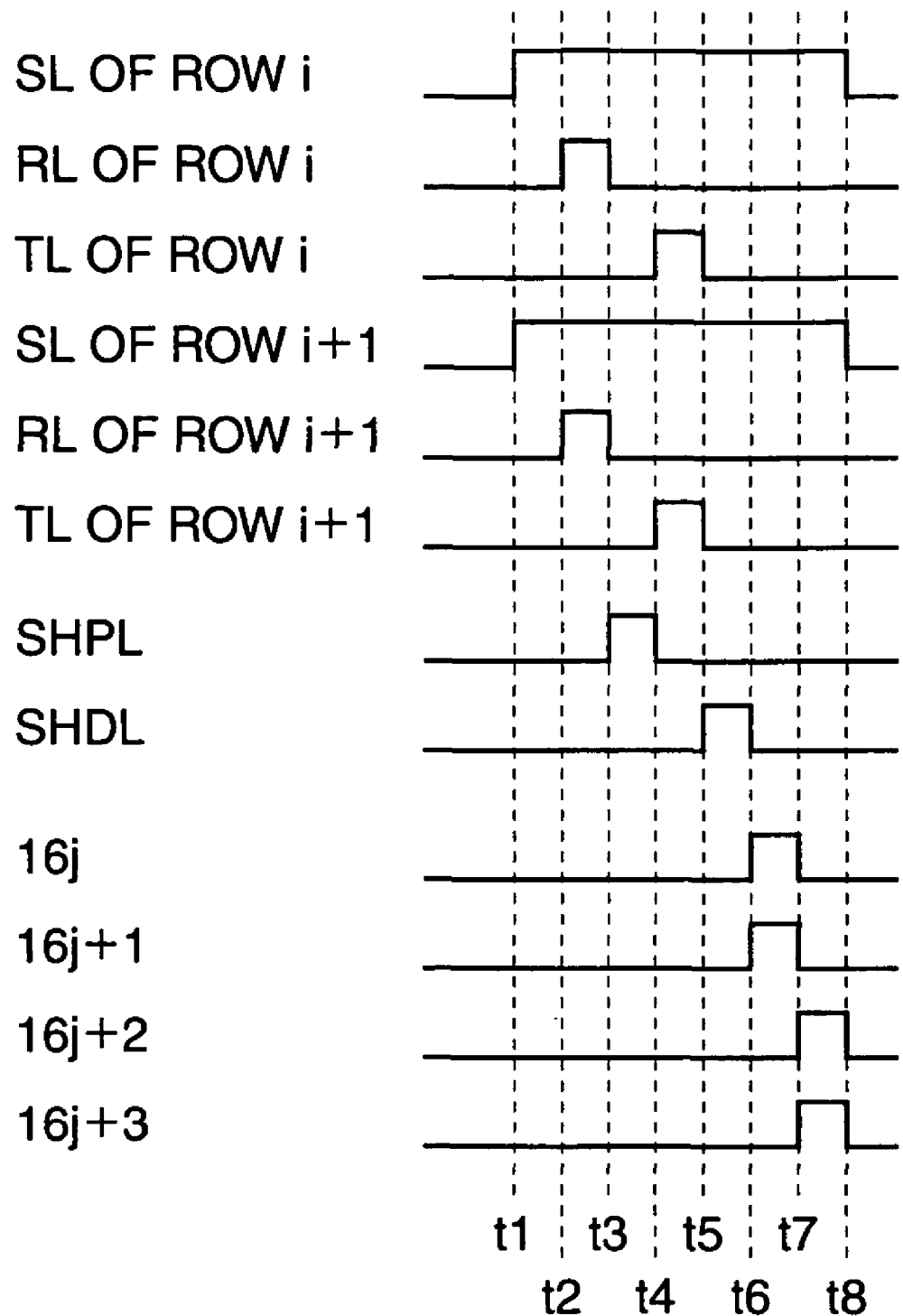
FIG. 8 is a timing-chart of the data output process of the imaging device.

The operation of the imaging device 101 in the third embodiment is described below with reference to FIG. 8, which is a timing-chart of the data output process of the imaging device 101. The operation of the eight pixels in rows i/i+1 and columns j~j+3 is described here.

At the time t1, the vertical shift register 11 outputs an ON signal to the SLs of rows i and i+1, and then the pixels of rows i/i+1 are selected to output pixel signals.

At the time t2, the vertical shift register 11 outputs an ON signal to the RLs of rows i and i+1, and then the FDs 23 of the pixels in rows i and i+1 are reset.

At the time t3, the vertical shift register 11 outputs an OFF signal to the RLs of rows i and i+1. At the same time, the vertical shift register 11 outputs an ON signal to the SHPL, and then the reset pixel signal from pixels in rows i and i+1 is sampled and held by the second and first CDS/SH circuits 12u, 12d.

At the time t4, the vertical shift register 11 outputs an OFF signal to the SHPL. At the same time, the vertical shift register 11 outputs an ON signal to the TLs of rows i and i+1, and then signal charges stored by the PDs 22 of the pixels in rows i and i+1 are transmitted to the FDs 23.

At the time t5, the vertical shift register 11 outputs an OFF signal to the TLs of rows i and i+1. At the same time, the vertical shift register outputs an ON signal to the SHDL, and then the raw pixel signal data from pixels in rows i and i+1 is sampled and held the second and first CDS/SH circuits 12u, 12d.

At the time t6, the vertical shift register 11 outputs an OFF signal to the SHDL. At the same time, the horizontal shift register 13 outputs an ON signal to the gate of column select transistors 16uj, 16dj, 16uj+1, 16dj+1 of columns j and j+1, and then pixel signal data of the R pixel 21(i,j), the G pixel 21(i+1,j), the G pixel 21(i,j+1), and the B pixel 21(i+1,j+1) are transmitted respectively to R, G, G, and B output lines 14r, 14gd, 14gu, 14b.

At the time t7, the horizontal shift register 13 outputs an OFF signal to the gates of column select transistors 16uj, 16dj, 16uj+1, 16dj+1 of columns j and j+1. At the same time, the horizontal shift register 13 outputs an ON signal to the gates of column select transistors 16uj+2, 16dj+2, 16uj+3, 16dj+3 of columns j+2 and j+3, and then pixel signal data of the R pixel 21 (i,j+2), the G pixel 21(i+1,j+2), the G pixel 21(i,j+3), and the B pixel 21(i+1,j+3) are transmitted respectively to R, G, G, and B output lines 14r, 14gd, 14gu, 14b.

Other pixel signal data of pixels in rows i and i+1 are transmitted to the R, G, G, and B output line 14r, 14gd, 14gu, 14b as the same times t6 and t7.

At the time t8, the vertical shift register 11 outputs an OFF signal to the SLs of rows i and i+1.

After the time t8, pixel signal data of pixels in other rows is transmitted to the R, G, and B output line 14r, 14gd, 14gu, 14b by carrying out the same control as the above.

Only the pixel signal data corresponding to red can be output from the R output line 14r, only the pixel signal data corresponding to green can be output from the G output line 14gd, 14gu, and only the pixel signal data corresponding to blue can be output from the B output line 14b in the third embodiment.

Further according to the third embodiment, the Iss do not have to turn on and off, and the output lines 14 where the pixel signals are transmitted, do not have to be changed. Further, it is not necessary to change timings for outputting the pixel signals to the first and second CDS/SH circuits, and it is not necessary to change timings for switching the column select transistors 16d, 16u of lower and upper sides, on and off. Consequently, the operation of the movement is simpler than that of the first and second embodiments.

Figure 9:
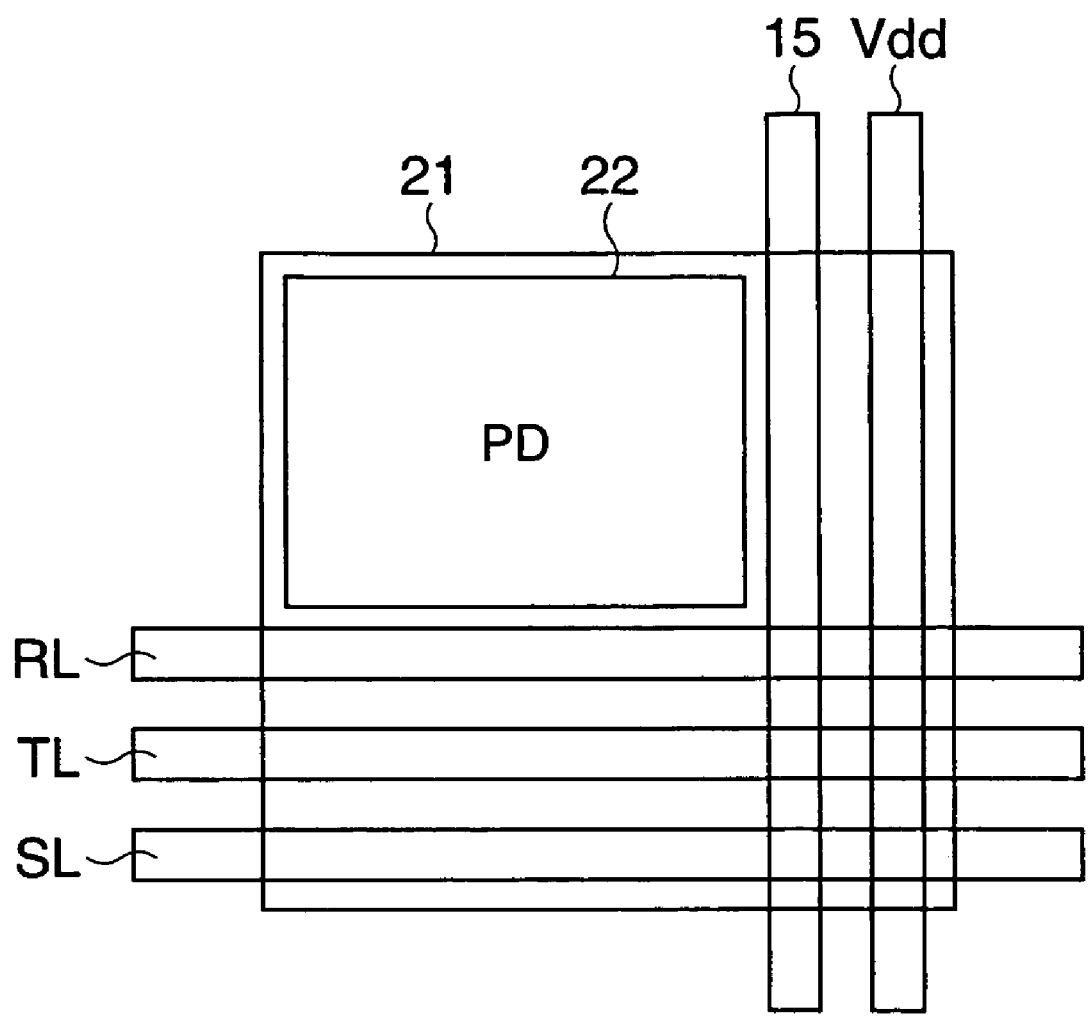
FIG. 9 illustrates a practical structure of a pixel in the first and second embodiments.
Figure 10:
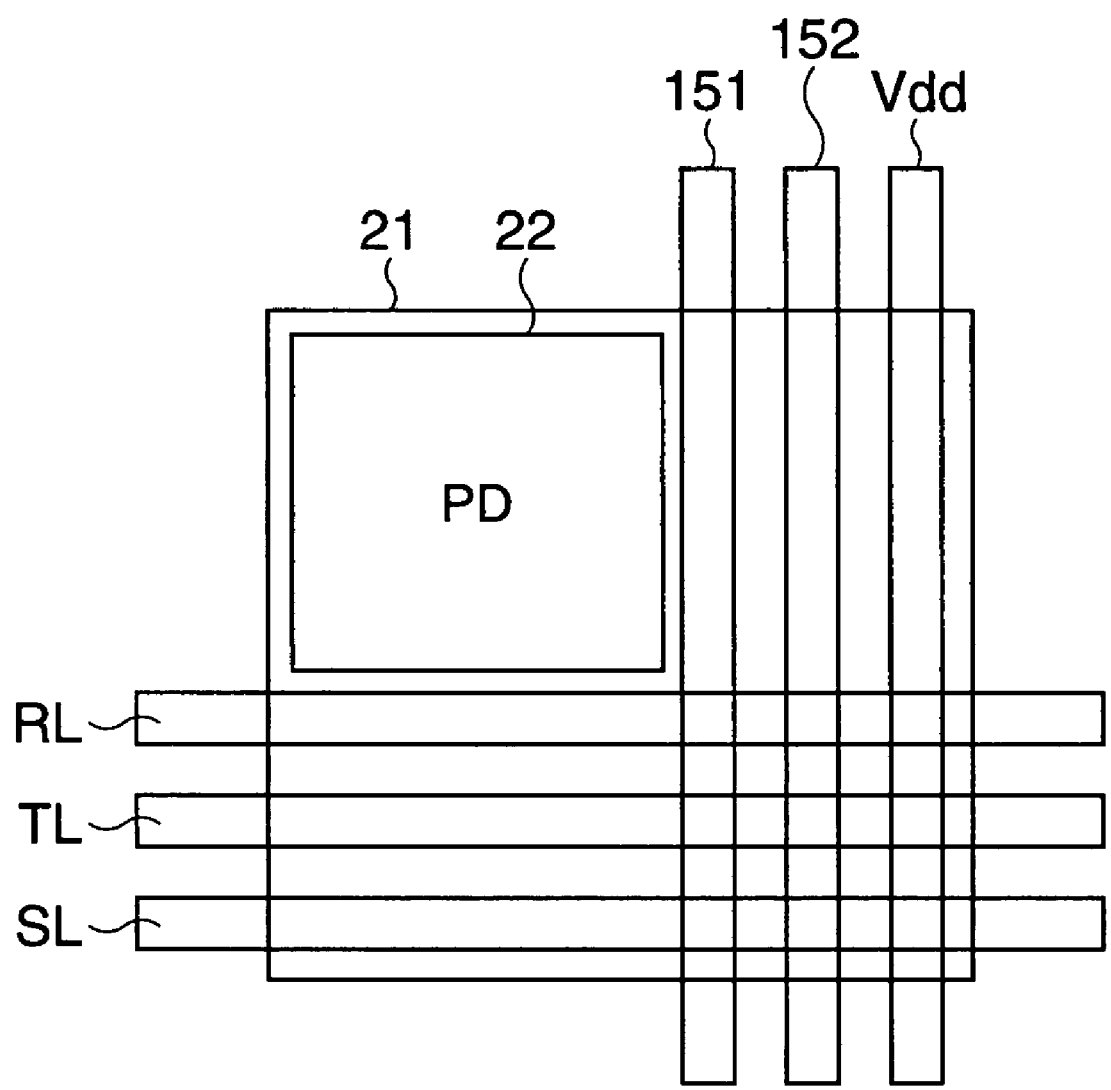
FIG. 10 illustrates a practical structure of a pixel in the third embodiment.

However, an area of the PD in the first and second embodiments can be larger than that of the third embodiment. The reason for this is explained with FIGS. 9 and 10. FIG. 9 illustrates a practical structure of a pixel in the first and second embodiments. FIG. 10 illustrates a practical structure of a pixel in the third embodiment. The area of PD in the first and second embodiments can be larger because the vertical transmission line in the first and second embodiments is less than that in the third embodiment as shown in FIGS. 9 and 10.

Further according to the third embodiment, it is easy to downsize an image signal formed by one frame of pixel signals. For example, the image signal can be downsized by outputting an average of two pixel signals instead of two pixel signals of the same color pixels, which are arranged in the same column. The average of the two pixel signals of the same color can be generated by sampling and holding the two pixel signals at the CDS/SH circuit 12 without outputting the first pixel signal before the second pixel signal being sampled and held. Using one transmission line only for pixel signals of one color enables the CDS/SH circuit 12 to generate the average of two pixel signals.

Figure 11:
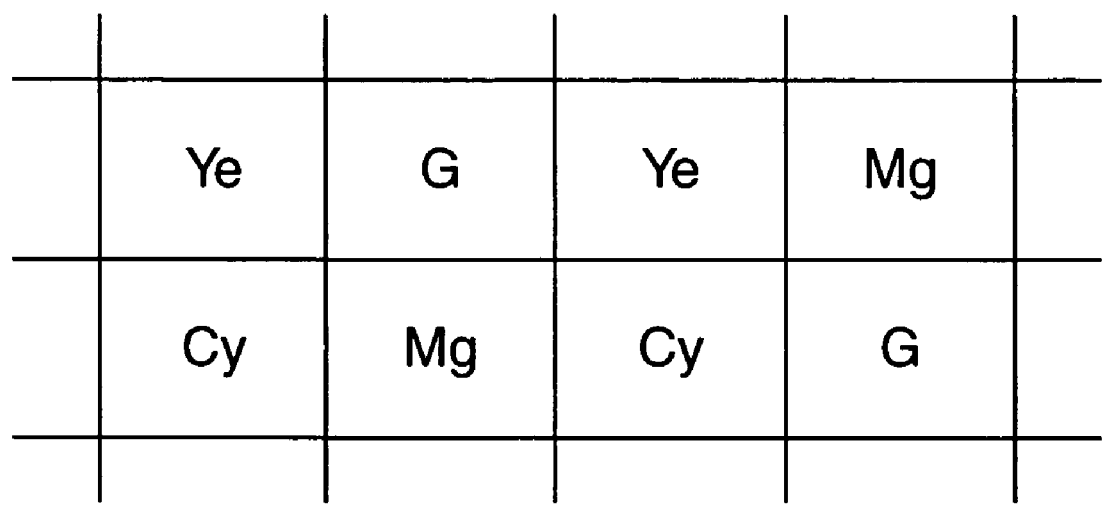

R, G, and B pixels are arranged according to the Bayer color array in the first, second, and third embodiments. However, Cy, Ye, Mg, and G pixels, that are respectively covered by cyan, yellow, magenta, and green color filter, may be arranged according to the complementary-color-difference line-sequential type as shown in FIG. 11.

Figure 12:
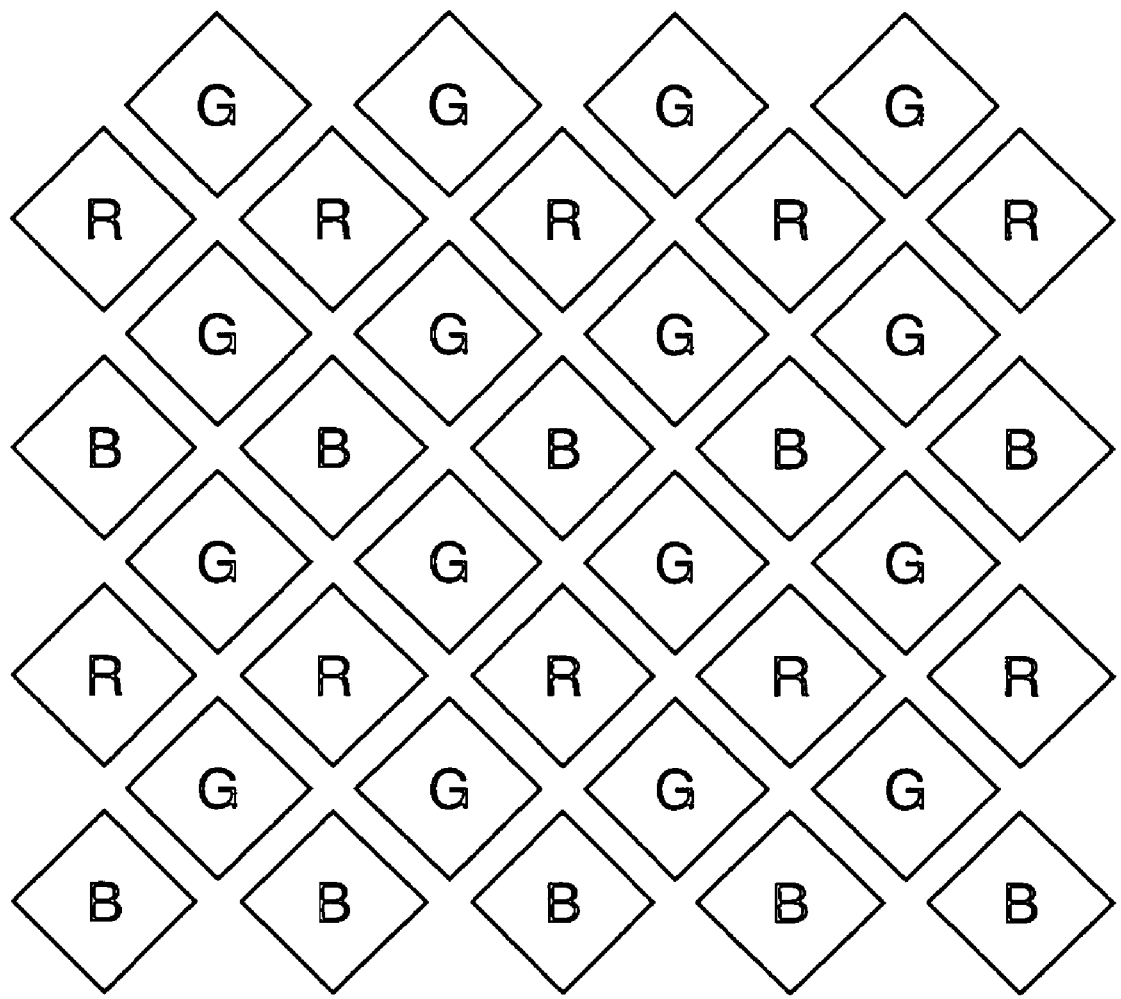
FIG. 12 illustrates a pixel arrangement according to one type of pixel interleaved array.
Figure 13:
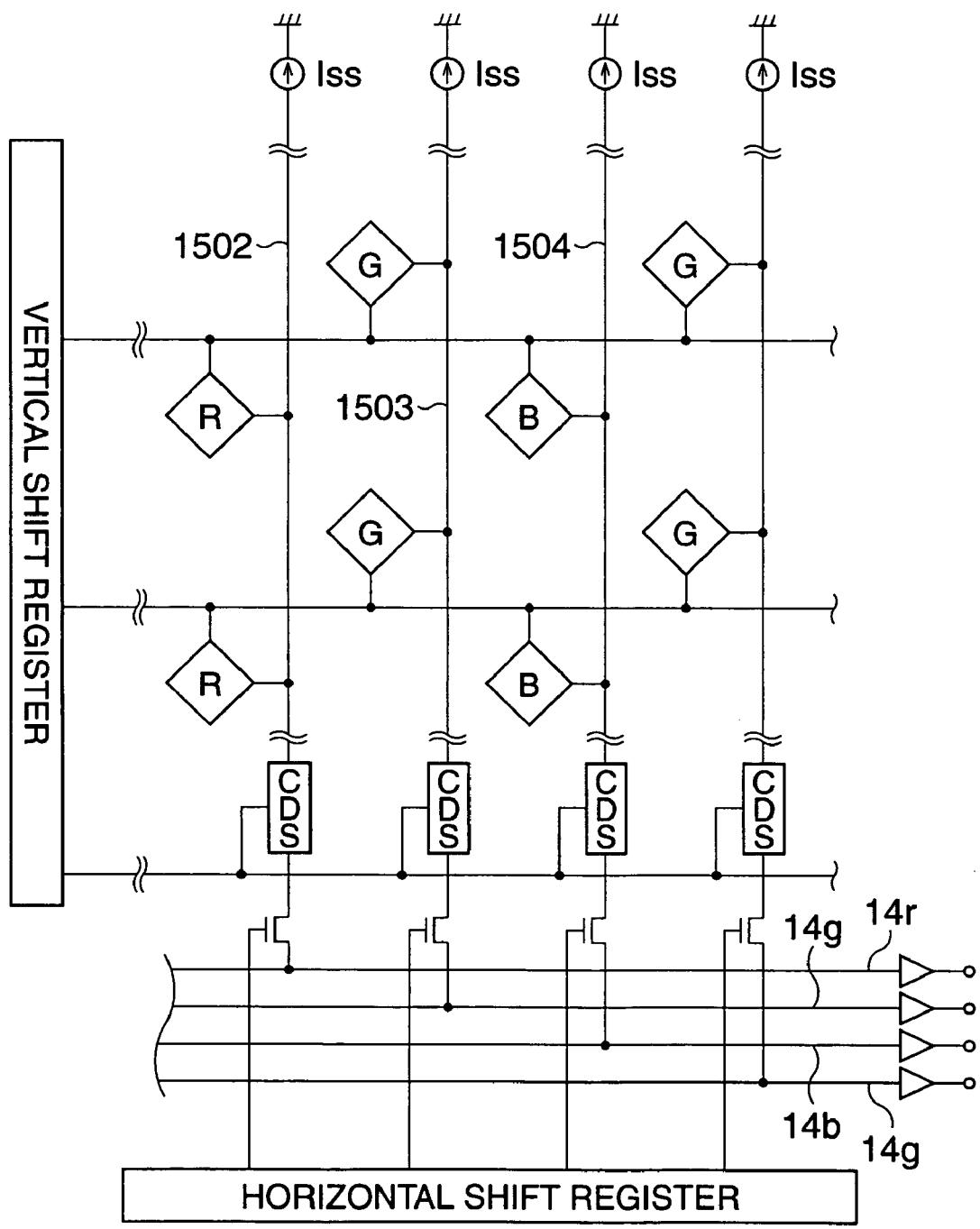
FIG. 13 illustrates a pixel arrangement according to another type of pixel interleaved array.
Figure 14:
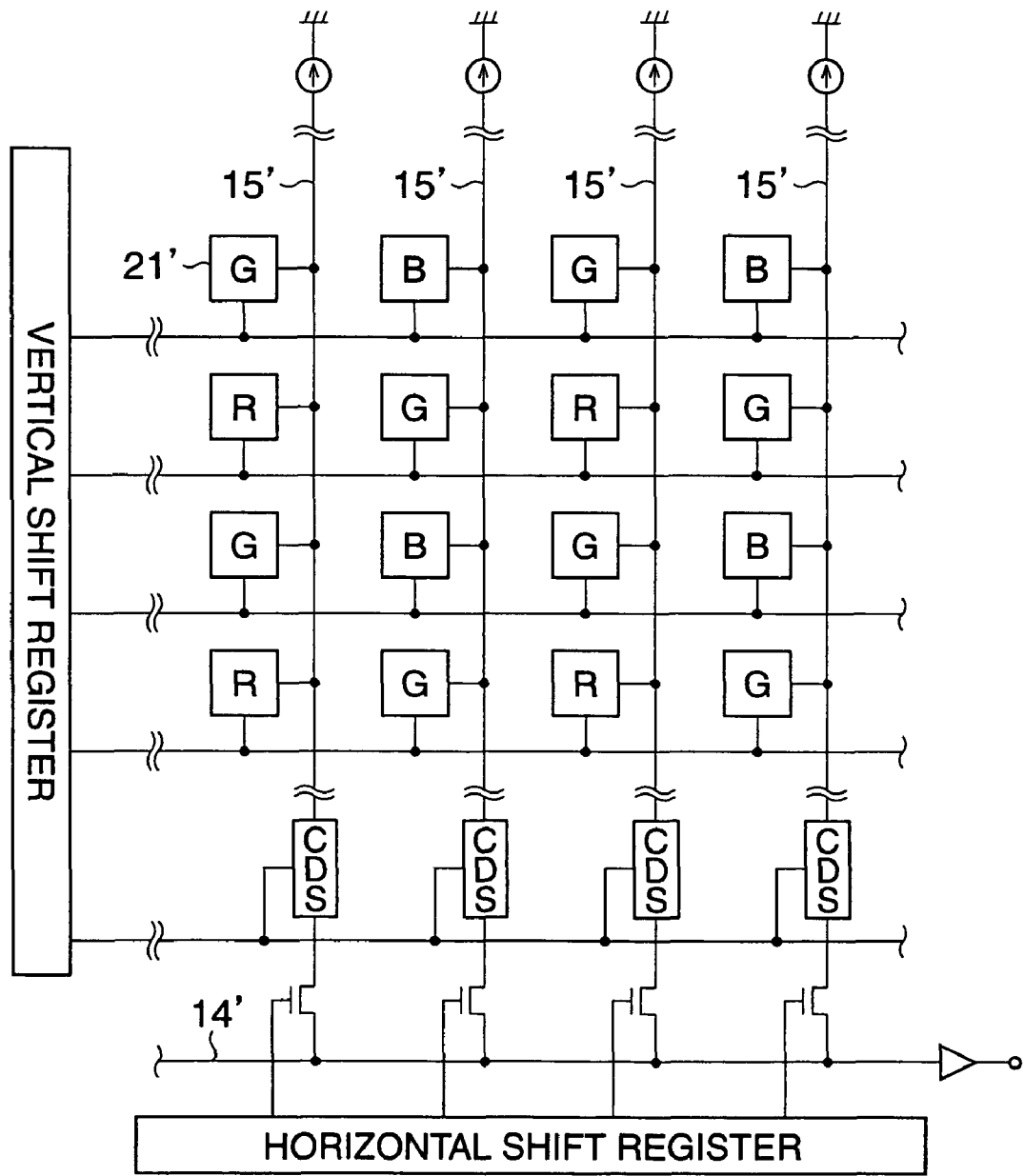
FIG. 14 illustrates a prior art structure.

The pixels are arranged according to the checked array in the first, second, and third embodiment. However, they may be arranged according to the pixel interleaved array as shown in FIGS. 12 and 13. Especially, an aperture can be broaden according to the Honeycomb arrangement as shown in FIG. 13 because only one vertical transmission line is mounted for one column. Further, each vertical transmission line 1502, 1503, 1504 is only connected to the pixels covered by the same color filter component according to the Honeycomb arrangement. Accordingly, the Iss do not have to turn on and off, and the output lines 14 where the pixel signals are transmitted do not have to be changed. Consequently the control of the operation is simpler.

The transmission line 15 passes vertically through a receiving surface in the first, second, and third embodiments. However, a transmission line may pass horizontally thorough. The number of transmission lines connecting pixels to output lines can be decreased by mounting transmission lines horizontally if a color filter covering the pixels arranged in a vertical column has more than three filter components and a color filter covering the pixels arranged in a horizontal row has one or two filter components.

The pixels are arranged in a matrix in the first, second, and third embodiments. However, in the present invention, any arrangement in two dimensions is adaptable.

The imaging device is a CMOS imaging device in the first, second, and third embodiments. However, the present invention may have any kind of imaging device, which comprises an XY address.

The transistors 23, 24, 25, and 26 in each pixel and the column select transistor 16 are n-channel type in the first and second embodiments. However, in the present invention, p-channel transistors are adaptable when changing the polarity of the electrical potential when connecting to each transistor 23, 24, 25, 26, and 16.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Applications No. 2005-114713 (filed on Apr. 12, 2005), which is expressly incorporated herein, by reference, in its entirety.

The invention claimed is:

1. A solid state imaging device, comprising:
a color filter having a first color filter component and a second color filter component;
a plurality of pixels with each pixel covered by a color filter component and a photoelectric conversion element that generates a color pixel signal according to a light amount received by said photoelectric conversion element;
a first output line that outputs only a first color pixel signal that is generated by a first pixel covered by said first color filter component;
a second output line that outputs only a second color pixel signal that is generated by a second pixel covered by said second color filter component, wherein said first and second pixels are arranged in two dimensions;
a common transmission line that is connected to said first pixel, said second pixel, said first output line, and said second output line, and transmits said color pixel signals output from said first and second pixels; and
a controller that controls the transmission of said color pixel signal to said first output line when said color pixel signal output to said common transmission line is said first color pixel signal, and transmission of said color pixel signal to said second output line when said color pixel signal output to said common transmission line is said first color pixel signal,
wherein said common transmission line is connected to first and second current sources that are turned on and off by said controller, said color pixel signal is transmitted to said first output line when said first current source is turned on, and said color pixel signal is transmitted to said second output line when said second current source is turned on.

2. A solid state imaging device, comprising:
a color filter having a first color filter component and a second color filter component;
a plurality of pixels with each pixel covered by a color filter component and a photoelectric conversion element that generates a color pixel signal according to a light amount received by said photoelectric conversion element;
a first output line that outputs only a first color pixel signal that is generated by a first pixel covered by said first color filter component;
a second output line that outputs only a second color pixel signal that is generated by a second pixel covered by said second color filter component;
a color filter having a third color filter component of a third color;
a third output line that outputs only a third color pixel signal that is generated by a third pixel covered by said third color filter component;
a first transmission line that is connected only to said first pixel and said first output line, and transmits said first color pixel signal output from said first pixel to said first output line;
a second transmission line that is connected only to said second pixel and said second output line, and transmits said second color pixel signal output from said second pixel to said second output line; and
a third transmission line that is connected only to said third pixel and said third output line, and transmits said third color pixel signal output from said third pixel to said third output line,
wherein:
said first, second, and third pixels are arranged in two dimensions;

first pixels and second pixels are arranged in a first color combination series;

said first pixels and third pixels are arranged in a second color combination series;

said first transmission line is mounted alongside said first color combination series and said second color combination series;

said second transmission line is mounted alongside said first color combination series;

said third transmission line is mounted alongside said second color combination series;

said first transmission line is connected to said first pixels arranged in said first color combination series and said second color combination series;

said second transmission line is connected to said second pixels arranged in said first color combination series; and said third transmission line is connected to said third pixels arranged in said second color combination series.

3. A solid state imaging device according to claim 2, wherein said first color is green, said second color is blue, and said third color is red.

4. A solid state imaging device, comprising:

a color filter having a first color filter component and a second color filter component;

a plurality of pixels with each pixel covered by a color filter component and a photoelectric conversion element that generates a color pixel signal according to a light amount received by said photoelectric conversion element;

a first output line that outputs only a first color pixel signal that is generated by a first pixel covered by said first color filter component;

a second output line that outputs only a second color pixel signal that is generated by a second pixel covered by said second color filter component;

a color filter having a third color filter component of a third color;

a third output line that outputs only a third color pixel signal that is generated by a third pixel covered by said third color filter component;

a first common transmission line that is connected to said first pixel, said second pixel, said first output line, and said second output line and transmits said color pixel signal output from said first and second pixels;

a second common transmission line that is connected to said first pixel, said third pixel, said first output line, and said third output line and transmits said color pixel signal output from said first and third pixels;

a first controller that controls the transmission of said color pixel signal to said first output line when said color pixel signal output to said first common transmission line is said first color pixel signal, and the transmission of said color pixel signal to said second output line when said color pixel signal output to said first common transmission line is said second color pixel signal; and a second controller that controls the transmission of said color pixel signal to said first output line when said color pixel signal output to said second common transmission line is said first color pixel signal, and the transmission of said color pixel signal to said third output line when said color pixel signal output to said second common transmission line is said third color pixel signal, wherein:

said first, second, and third pixels are arranged in two dimensions;

said first common transmission line is connected to first and second current sources that are turned on and off by said first controller;

said second common transmission line is connected to third and fourth current sources that are turned on and off by said second controller;

said color pixel signal is transmitted to said first and second output lines respectively when said first and said second current sources are turned on; and said color pixel signal is transmitted to said first and third output lines respectively when said third and said fourth current sources are turned on.

5. A solid state imaging device according to claim 4, wherein first pixels and second pixels are arranged in a first color combination series;

said first pixels and third pixels are arranged in a second color combination series;

said first common transmission line is mounted alongside said first color combination series;

said second common transmission line is mounted alongside said second color combination series;

said first common transmission line is connected to said first and said second pixels arranged in said first color combination series; and said second common transmission line is connected to said first and said third pixels arranged in said second color combination series.

6. A solid state imaging device according to claim 4, wherein said first color is green, said second color is blue, and said third color is red.

* * * * *